Jan. 17, 1928.                                                     1,656,867
F. PORSCHE
ROTARY PISTON BLOWER
Filed Jan. 14, 1925

Patented Jan. 17, 1928.

1,656,867

UNITED STATES PATENT OFFICE.

FERDINAND PORSCHE, OF STUTTGART-UNTERTURKHEIM, GERMANY, ASSIGNOR, BY MESNE ASSIGNMENTS, TO DAIMLER-BENZ AKTIENGESELLSCHAFT, OF BERLIN, GERMANY.

ROTARY-PISTON BLOWER.

Application filed January 14, 1925, Serial No. 2,453, and in Germany August 14, 1924.

This invention relates to blowers, more particularly of the Roots type. These blowers are normally operated by rigid, unyielding or non-flexible members connecting the same to an internal combustion engine or like prime mover and are often used for introducing the air for combustion or the explosive mixture at a pressure above atmospheric into the working cylinders of the engine.

The object of the invention is to prevent dangerous oscillations especially resonancy oscillations being formed in the operating mechanism which may be caused firstly by the torsional elasticity of the driving shaft and by retardations and accelerations of the varying drive, and second by the self-oscillations of the rotating parts of the blower.

A further object of this invention is to insert positively closing members in the driving mechanism which at a dangerous moment allow of a turning of the oscillating masses relatively to one another and thereby prevent any fracture or injury to the parts.

In a Roots blower the invention may be employed for example by mounting the pistons of the blower revolubly on piston shafts coupled by gear wheels and to arrange between the piston shafts and the pistons coupled therewith by means of gear wheels, friction clutches of any suitable type.

One example of construction of the invention is illustrated diagramatically in two figures in the accompanying drawings.

Figure 1:
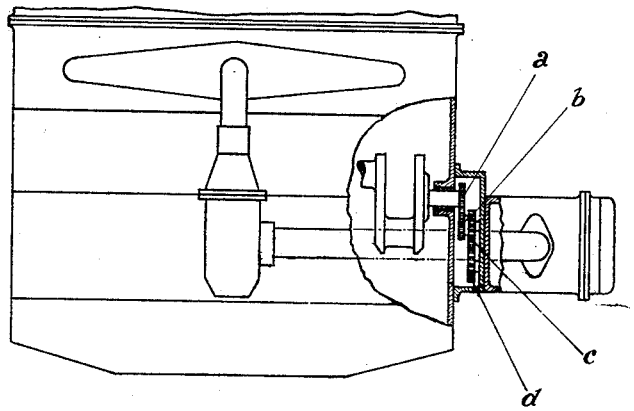
Figure 1 is an elevation showing an internal combustion engine with a blower which serves for charging the internal combustion engine at high pressure.
Figure 2:
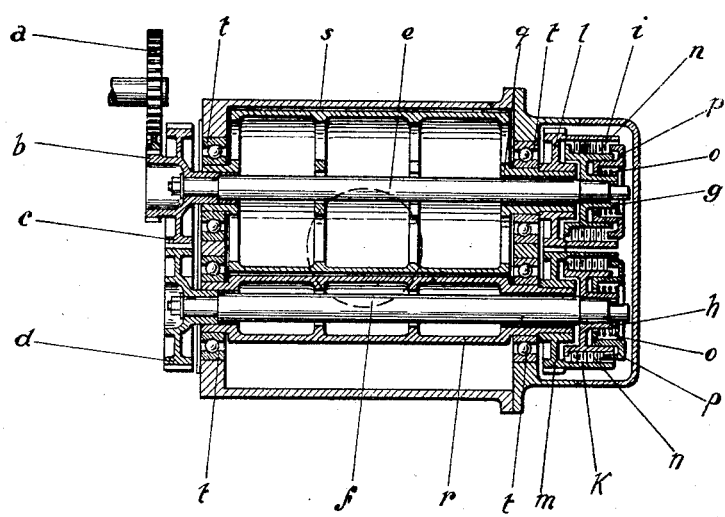
Figure 2 is a section on an enlarged scale of the blower itself.

The blower is for example, driven from the crank shaft of the internal combustion engine by means of a toothed wheel $a$ which is in constant mesh with a toothed wheel $b$. On the hub of the toothed wheel $b$ a further pinion $c$ is mounted which gears with a pinion $d$. The pinion $c$ is mounted on the shaft $e$ and the pinion $d$ on the shaft $f$.

The shaft $e$ and the shaft $f$ carry one element of friction clutches $g$ and $h$ respectively on the end opposite the toothed wheels $b$ and $d$. The second element $i$ and $k$ respectively of these clutches connects with the toothed wheels $l$ and $m$. Between the elements $i$, $g$ and $h$, $k$ plates $n$ are inserted. The plates of the couplings are pressed together by means of a spring $o$, through a ring $p$.

The toothed wheels $l$ and $m$ which mesh together are mounted on vanes or pistons $q$ and $r$ which rotate in the casing $s$, and are mounted in ball bearing $t$.

The spring $o$ for pressing together the elements of the clutch is of such strength that under normal stresses the clutch does not yield, but a relative displacement of the elements of the clutch takes place when in consequence of resonancy oscillations or dangerous stresses of the masses on the sudden stoppage of the motor strains are set up which might cause a fracture or injury of the parts. A friction clutch of any other suitable type may be employed instead of a plate clutch.

I declare that what I claim is:

1. A rotary piston blower adapted to be driven by an internal combustion engine for supercharging the latter, comprising shafts, coacting pistons, automatic clutches independently coupling said pistons with said shafts, positive driving means for said shafts, and said pistons being positively geared together.

2. A rotary piston blower adapted to be driven by an internal combustion engine for supercharging the latter, comprising shafts, coacting pistons freely supported by said shafts, automatic clutches independently coupling said pistons, positive driving means for said shafts, and said pistons being positively geared together.

3. A rotary piston blower adapted to be driven by an internal combustion engine for supercharging the latter, comprising shafts, coacting pistons on said shafts, an automatic clutch forming the connection between one of the pistons and its shaft, positive driving means for said shafts, and said pistons being positively geared together.

In testimony whereof I affix my signature.

FERDINAND PORSCHE.